May 31, 1949.

R. R. CANDOR 2,471,862

TIME AND TEMPERATURE CONTROLLER
FOR DOMESTIC APPLIANCES

Original Filed Oct. 11, 1943

INVENTOR.
ROBERT R. CANDOR
BY
Spencer Hardman & Epler
Attorneys

May 31, 1949.

R. R. CANDOR

TIME AND TEMPERATURE CONTROLLER FOR DOMESTIC APPLIANCES 2,471,862

Original Filed Oct. 11, 1943

INVENTOR.
ROBERT R. CANDOR
BY
Spencer Hardman & Feke
Attorneys

May 31, 1949. R. R. CANDOR 2,471,862
TIME AND TEMPERATURE CONTROLLER
FOR DOMESTIC APPLIANCES
Original Filed Oct. 11, 1943 5 Sheets-Sheet 3
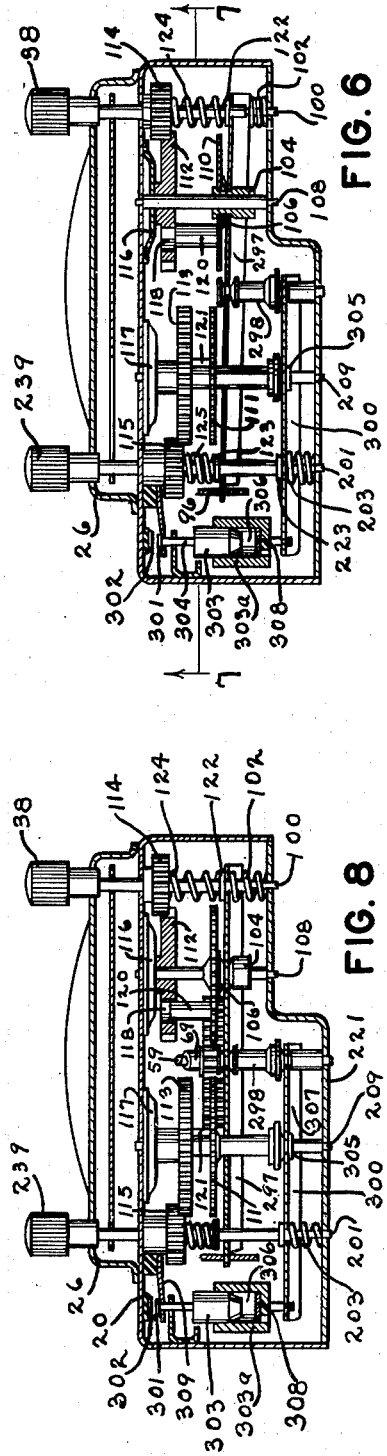
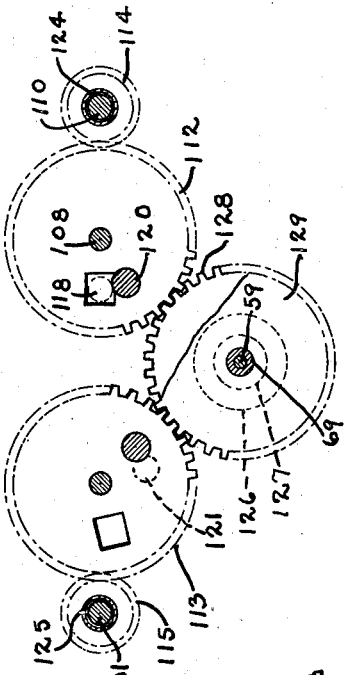
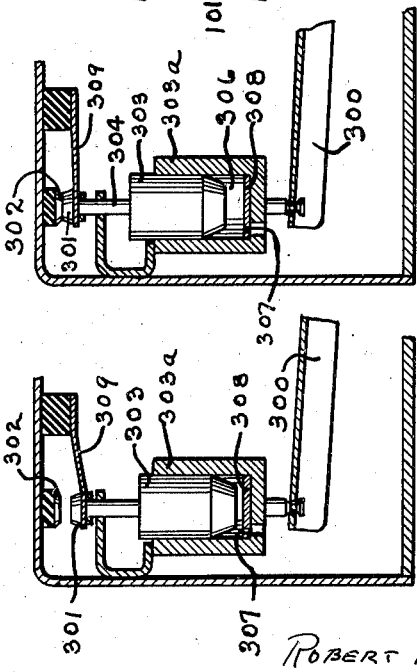
INVENTOR.
Robert R. Candor
BY INVENTOR.
Robert R. Candor
BY
Spencer Hardman & John
Attorneys Patented May 31, 1949

2,471,862

UNITED STATES PATENT OFFICE 2,471,862

TIME AND TEMPERATURE CONTROLLER FOR DOMESTIC APPLIANCES

Robert R. Candor, Oakwood, Ohio, assignor to General Motors Corporation, Dayton, Ohio, a corporation of Delaware Original application October 11, 1943, Serial No. 505,749, now Patent No. 2,451,069, dated October 12, 1948. Divided and this application August 17, 1945, Serial No. 610,998

6 Claims. (Cl. 219—20)

This invention relates to domestic appliances and more particularly to a combined time and thermostatic control for heaters, such as oven heaters in domestic ranges.

This application is a division of my copending application S. N. 505,749, filed October 11, 1943, for Time and temperature controller for domestic appliances, now Patent No. 2,451,069, issued October 12, 1948.

An object of this invention is to provide a combined time and thermostatic control of such a character that it is only necessary to set the time device on the timer and to adjust the thermostat, without the necessity of also setting an extra selector knob of the character which heretofore has been used to place the timer in control.

Another object of this invention is to provide an improved thermostatic control which is capable of being returned to the off position automatically by a timer.

Another object of this invention is to provide a thermostat for controlling heating means, which is provided with means for returning the thermostat to a desired position at the expiration of a predetermined period of time.

Further objects and advantages of the present invention will be apparent from the following description, reference being had to the accompanying drawings, wherein a preferred form of the present invention is clearly shown.

In the drawings:

Fig. 6 is an elevation taken along the lines 6—6 of Fig. 2;

Fig. 7 is a section of certain parts taken along the lines 7—7 of Fig. 6;

Fig. 8 is a section similar to Fig. 6 but showing the parts in a changed position;

Fig. 14 is an enlarged view of the return switch; and

Fig. 15 is a view similar to Fig. 14 but with the device in a later position.

Figure 1:
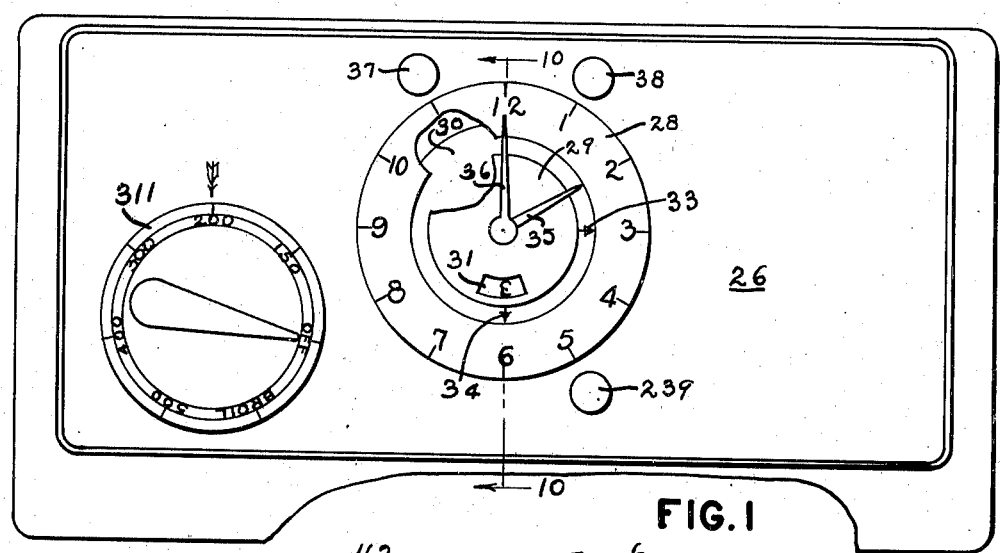
Fig. 1 is a front elevation of a preferred embodiment of the invention, certain parts being broken away.
Figure 2:
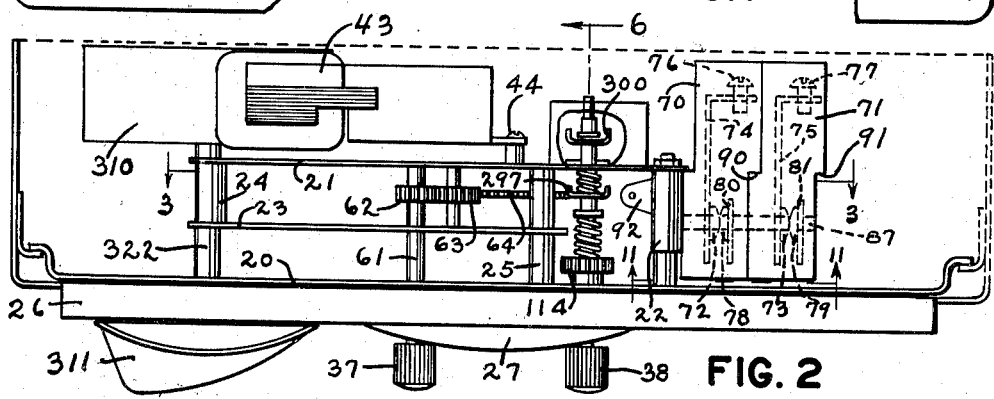
Fig. 2 is a plan view showing the general organization of the device shown in Fig. 1, certain parts being omitted for the purpose of clarity.
Figure 3:
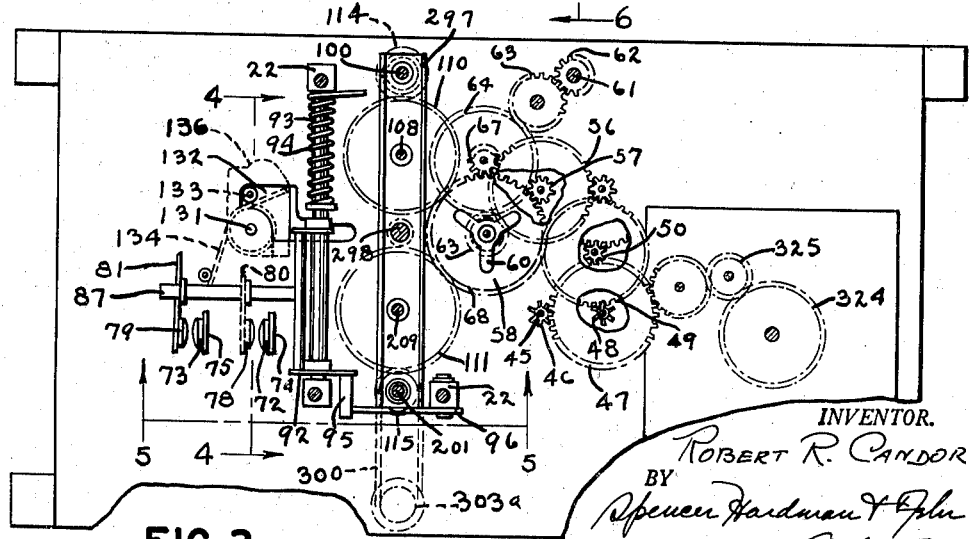
Fig. 3 is a rear sectional elevation taken along the lines 3—3 of Fig. 2.
Figure 4:
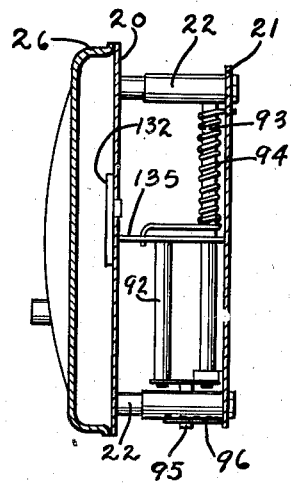
Fig. 4 is a section taken along the lines 4—4 of Fig. 3.
Figure 5:
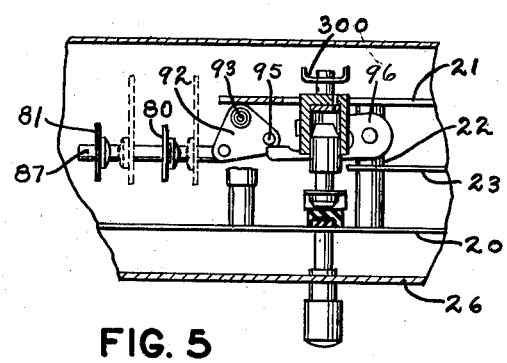
Fig. 5 is a section taken along the lines 5—5 of Fig. 3.
Figure 9:
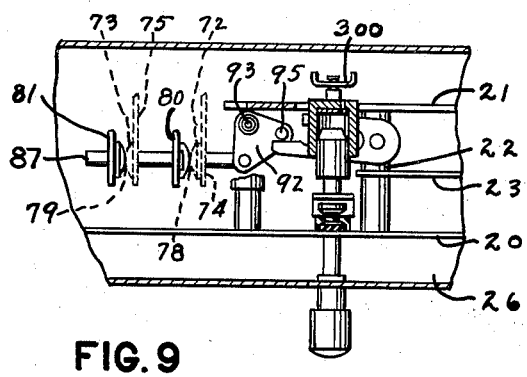
Fig. 9 is a section similar to Fig. 5, but showing the parts in a different position.
Figure 10:
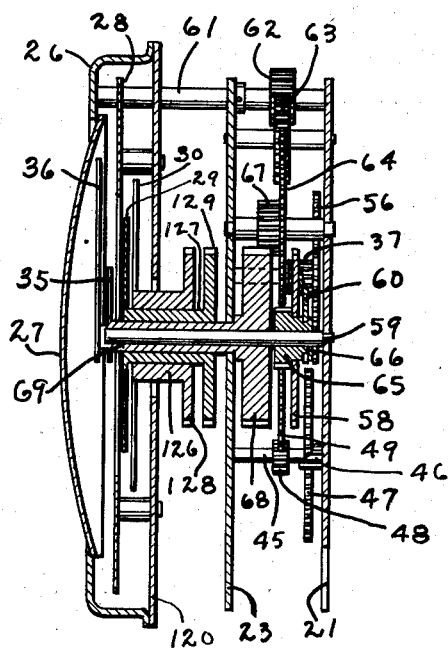
Fig. 10 is a section taken along the lines 10—10 of Fig. 1.
Figure 11:
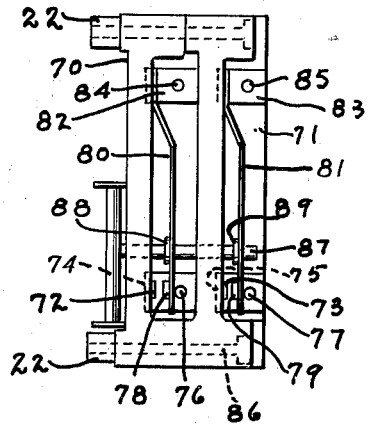
Fig. 11 is an elevation of the contact units taken along the section line 11—11 of Fig. 2.

Heretofore it has been customary to provide a timing device to be used in combination with a thermostatic device to control the electric or gas heaters of domestic ranges. It has been customary, when the user desires to set the controls, for the user to set an on indicator and off indicator, a thermostatic indicator, and in addition a selector knob which determines whether the timer should be in control or not. This additional knob is likely to be forgotten at certain times, and this invention makes it possible to eliminate such a knob.

For example, the control disclosed in the United States patent to Hutt 2,310,527, granted February 9, 1943, is provided with an on or start indicator 33, an off or stop indicator 34 and a selector knob 40 which determines whether the clock control is to be effective or not. The control shown in the said Hutt patent is intended to be used with a thermostatic control, not shown in the patent, which is also provided with an adjusting knob. This invention makes it possible to eliminate the knob 40.

In the Hutt patent there is also disclosed another knob 41, which has no particular connection with the oven control, and discussion thereof is therefore omitted, it being understood that the device controlled by knob 41 may be used with or omitted from, the present invention.

This invention has been shown as applied to certain portions of the mechanism disclosed in the said Hutt patent merely by way of example; but it is to be understood that many of the parts herein disclosed may be used with other constructions of timers. Many of the views of the Hutt patent have been repeated in this application, with the modifications of this invention thereon. Wherever numerals are used on the drawings which coincide with the reference numerals of the Hutt patent, it is to be understood that the parts so indicated are constructed and operate in the same manner as disclosed in the Hutt patent.

The modifications of this invention deal mainly with the bar 97, pin 98, shaft construction 109 and setting knob 39 of the Hutt patent. These have been modified in this application to the form shown as 297, 298, 209, 239 and 201. In this application, the bar 297 is pivoted on pin 298 and freely encompasses the shafts 209 and 201, and is not affected by the operation of these shafts. The shaft 209, and its cooperating parts, have been changed to actuate a bar 300, which is also pivoted on the pin 298, so that the bar 300 actuates the return contact 301 when the time indicator 35 comes into coincidence with off indicator 34. By reference to the Hutt patent, it is therefore evident that the user may set the start indicator 33 by means of the knob 38, and this will rock the bar 297 about the pivot 298, to the position shown in Fig. 6. The user can also set the off or stop indicator 34 by means of the knob 239, and this will rock the bar 300 about the fulcrum 298 to the position shown in Fig. 6. The adjustment of the on indicator 33 away from the time indicator 35 positively opens the switch 78, 79 as in the Hutt patent. At three o'clock, by way of example, when the time indicator 35 comes into coincidence with the on or start indicator 33, the hub 104 will take the position shown in Fig. 8, and causes the bar 297 to rock about the pivot 298 to close the switch 78, 79 substantially the same as described in the Hutt patent, with the exception that the bar 297 fulcrums about fixed pivot 298 instead of fulcruming about the hub 105 as described in the Hutt patent. The operation is substantially the same, and the parts of the Hutt patent do not have to be changed except for slight dimensional changes, which are obvious.

When the time indicator 35 comes into coincidence with the off or stop indicator 34, the hub 305 rises and rocks the bar 300 upwardly about the fulcrum 298 with the aid of spring 203 and this raises the switch 301 into contact with its stationary contact 302. A dash-pot construction is used between the bar 300 and the contact 301, so that the first movement of the bar 300 forces the cup 303a and plunger 303 upward to move the rod 304 and contact 301 into contact with the stationary contact 302, as shown in Fig. 14. The air compressed at 306 then slowly leaks out through the perforation 307 in valve 308, and a few moments later the plunger 303 is forced down by the spring 309, carrying with it the contact 301, away from contact 302 as shown in Fig. 15.

From the foregoing it is to be seen that the Hutt patent construction has been modified by omitting the knob 40, and all the parts controlled by it, and in lieu thereof, the switch 301, 302 has been substituted, which is so constructed that it is momentarily closed when the time indicator comes into coincidence with the off or stop position (at six o'clock), and is opened a few moments thereafter. The knob 41, and parts controlled thereby have been omitted in this disclosure, although it is to be understood that they can be added, if desired.

A thermostat 310, having a control knob 311 has been shown as associated in the same casing with the timing mechanism, although it is to be understood that it can be placed at some other place on the range and connected by wiring, as is readily understood. The thermostat in casing 310 is of well-known construction and is provided with a thermostatic bulb 312, which is responsive to the temperatures in the oven 313. The electric heaters 314, 315 are controlled by switching mechanism in the thermostat 310, under impulses received from the thermostatic bulb 312. By way of example, both of the heaters 314 and 315 are completely disconnected in the box 310 when the knob 311 is in the off position. When the knob 311 is turned to some cooking or bake position, such as 200°, the lower heater 314 is energized at full wattage and the upper heater 315 is energized at reduced wattage, and these heaters are cycled by the switch construction 310 under the control of the bulb 312 to maintain the desired temperature in oven 313. The lower heater 314 in this position of the knob 311 is connected to the live lines 316 and 317, while the upper heater 315 is connected to one of the live lines 316 or 317 and with the ground line 318, with an external resistance 319 added, if desired, in order to produce as low a wattage in heater 315 as desired. By way of modification, the upper heater 315 may be connected to one of the live lines 316 or 317 at one of its terminals, and its other terminal may be connected by the line 320 to the point 321 in the lower heater 314 to impose the correct reduced wattage to the upper heater. When the knob 311 is turned to broil, the upper heater 315 alone is energized at full wattage by being connected to the live lines 316 and 317 while the lower heater is completely deenergized. If desired the construction may be such that when the knob 311 is first turned to broil and then returned to 200 (or any other lower temperature) then both heaters 314 and 315 are energized at full wattage until the oven reaches the selected temperature and thereatfer the heaters are cycled as heretofore described with regard to the 200° setting. A thermostat of this construction is now known commercially, and is also described in the application of Victor Weber, S. N. 323,162, filed March 9, 1940, now Patent No. 2,385,434, issued September 25, 1945. For this reason, details of the thermostatic switch construction in casing 310 are not disclosed, it being sufficient to state that a thermostatic bellows in the casing 310 actuates proper switch construction to cycle the heaters 314 and 315 in response to impulses from the bulb 312. Turning of the knob 311, which turns the shaft 322 adjusts the bellows in such a manner that the bellows maintains the selected temperature in the oven, and the heaters are energized, or cycled, in the selected manner.

To the well-known thermostatic construction heretofore described, this invention adds return means for returning the knob 311 from a cooking position to the off position, this means being rendered effective when the time indicator 35 comes into coincidence with the off or stop indicator 34 (at six o'clock by way of example). Means are also provided for preventing the return means from operating more than once until after the off indicator 34 has again been adjusted away from the time indicator 35. The purpose of this construction is to return the knob 311 to the off position at the termination of a time controlled cooking operation and also to prevent the thermostat from being returned accidentally to the off position if the user should decide to operate the thermostat manually without resetting the off indicator 34 out of coincidence with the time indicator 35.

Figure 12:
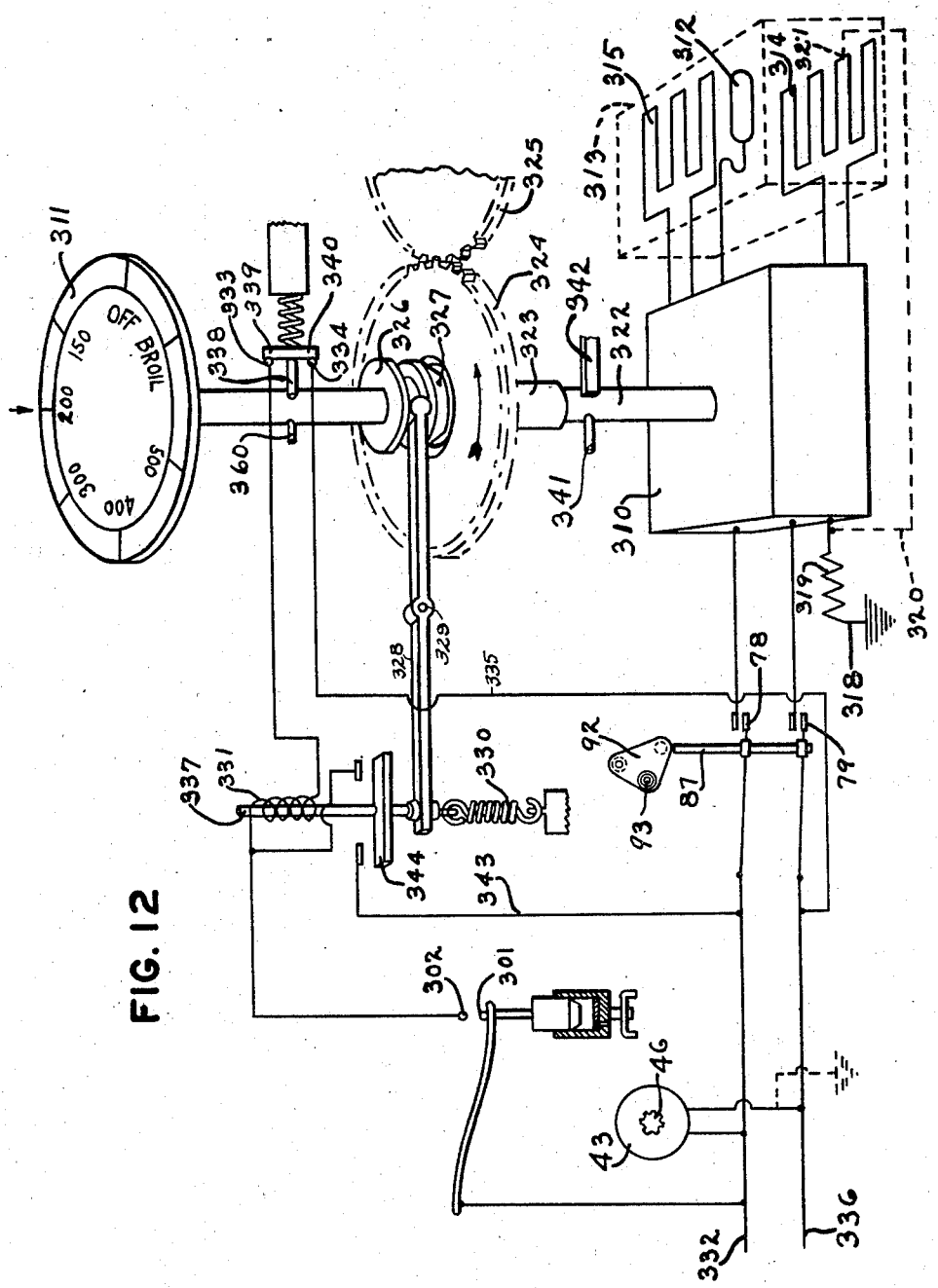
Fig. 12 is a wiring diagram showing the thermostatic control with the automatic return means.

The means for returning the knob 311 to the off position include the switch construction 301, 302 heretofore described, and in addition certain parts shown in Fig. 12. The shaft 322 is surrounded by a sleeve 323 which is loosely rotatable on the shaft 322 and carries a gear 324. The gear 324 is continuously rotated through gearing 325, which may be connected through gear 47 with the clock motor gear 46. A clutch sleeve 326 is rotationally fixed, but axially movable on shaft 322, and is provided with a cone clutch 327. The sleeve 326 is moved by lever 328, fulcrumed at 329 and normally rocked counterclockwise by tension spring 330. When the time indicator 35 comes into coincidence with the stop or off indicator 34, the switch 301, 302 is closed, as heretofore described, assuming the position shown in Fig. 14. Therefore the contacts 301 and 302, shown in Fig. 12 are temporarily closed, and this energizes the solenoid 331, a circuit being produced from power line 332 through contacts 301, 302, solenoid 331, contacts 333, 334, line 335 to power line 336. Energization of solenoid 331 raises the armature 337 and rocks the lever 328 clockwise to engage the clutch 327 with the gear 324 and sleeve 323. This returns the shaft 322 and knob 311 counterclockwise to the off position. As the shaft 322 reaches the off position, the pin 360 comes into contact with the rod 338 of the switch 339 and moves the contact 340 away from the stationary contacts 333 and 334, thus breaking the solenoid circuit and declutching the shaft 322 at the time that the knob 311 reaches the off position. If desired, an additional pin 341 is provided for abutment against the stationary stop 342 to prevent rotation of the knob 311 counterclockwise beyond the off position. Also, if desired, a holding circuit is provided for the solenoid 331 by the line 343, which is connected by the switch 344 with one side of the solenoid to hold the same energized in case the switch 301, 302 should open before knob 311 has been fully returned to the off position.

The operation of the modification shown in Figs. 1 to 12 inclusive 14 and 15 is as follows: The user (at two o'clock, for example) adjusts the start knob 38 and sets the on indicator 33 at three o'clock and adjusts the off or stop knob 239 to set the off or stop indicator 34 at six o'clock. He also turns the thermostat knob 311, for example, to 200. This causes the parts 297 and 300 to assume the position shown in Fig. 6. The operation of most of the control parts to reach this position is described in the Hutt patent. The pushing down of knob 239 also pushes down the bar 300 by means of the collar 223 while the collar 123 does not come into contact with the bar 297. These manipulations rock the bar 297 clockwise and the bar 300 counterclockwise to the position shown in Fig. 6 and move the pins 120 and 121 out of the apertures 118 and 119. The cup 303a is also lowered, air quickly entering space 306 by the raising of valve 308. The oven 313 is not heated at that time (two o'clock) because the power is broken at 78, 79 by this adjustment. The time indicator 35 then continues to rotate clockwise until it comes to coincidence with the on or start indicator 33 at three o'clock. At this time the pin 120 rises into aperture 118 and causes the hub 104 to rise to the position shown in Fig. 8, and rocks the bar 297 counterclockwise about the fulcrum 298 and closes the switches 78 and 79, substantially as described in the Hutt patent with the exception that the bar 297 is fulcrumed about 298. Power or current can then flow from the live lines 332 and 336 through the closed switch 78, 79, through the thermostatic switch 310 to the heaters 314 and 315. The heaters then heat the oven 313 until it reaches a temperature of 200°, at which time the thermostat disconnects the heaters 314 and 315 until such time as the oven 313 tends to cool below 200. Thereafter the heaters are re-energized, and a cycling control of the heaters by the switch construction in 310 continues, on and off, until six o'clock. At six o'clock the time indicator 35 comes into coincidence with the stop or off indicator 34. At this time the pin 121 rises into aperture 119 and causes the hub 305 to rise from the position shown in Figs. 6 and 8 to rock the bar 300 clockwise about fulcrum 298 to raise the cup 303a, plunger 303 and contact 301 to the position shown in Fig. 14 thus momentarily closing the contacts 301 and 302. This energizes the solenoid 331 and clutches the continuously rotating gear 324 with shaft 322 to return the knob 311 to the off position as heretofore described. The switch 301, 302 is then reopened by the slow leak of air from space 306, heretofore described, and assumes the position shown in Fig. 15, so that the returning movement of knob 311 cannot be repeated until after the off or stop indicator 34 is adjusted away from coincidence with the time indicator 35. This permits the user thereafter to use the knob 311 independently of the time control without danger of having the knob returned to the off position until such time as he elects to reset the time control. When using the knob 311 independently of the time control (by leaving the indicators 33 and 34 in coincidence with indicator 35), the contacts 78 and 79 are closed and allow power to flow continuously to thermostat 310. As long as the thermostat knob 311 is at off the power is broken at 310. The user can turn the knob 311 to any desired position and may operate the oven just as if the time control were not present merely by allowing the indicators 33, 34 and 35 to remain in coincidence.

Figure 13:
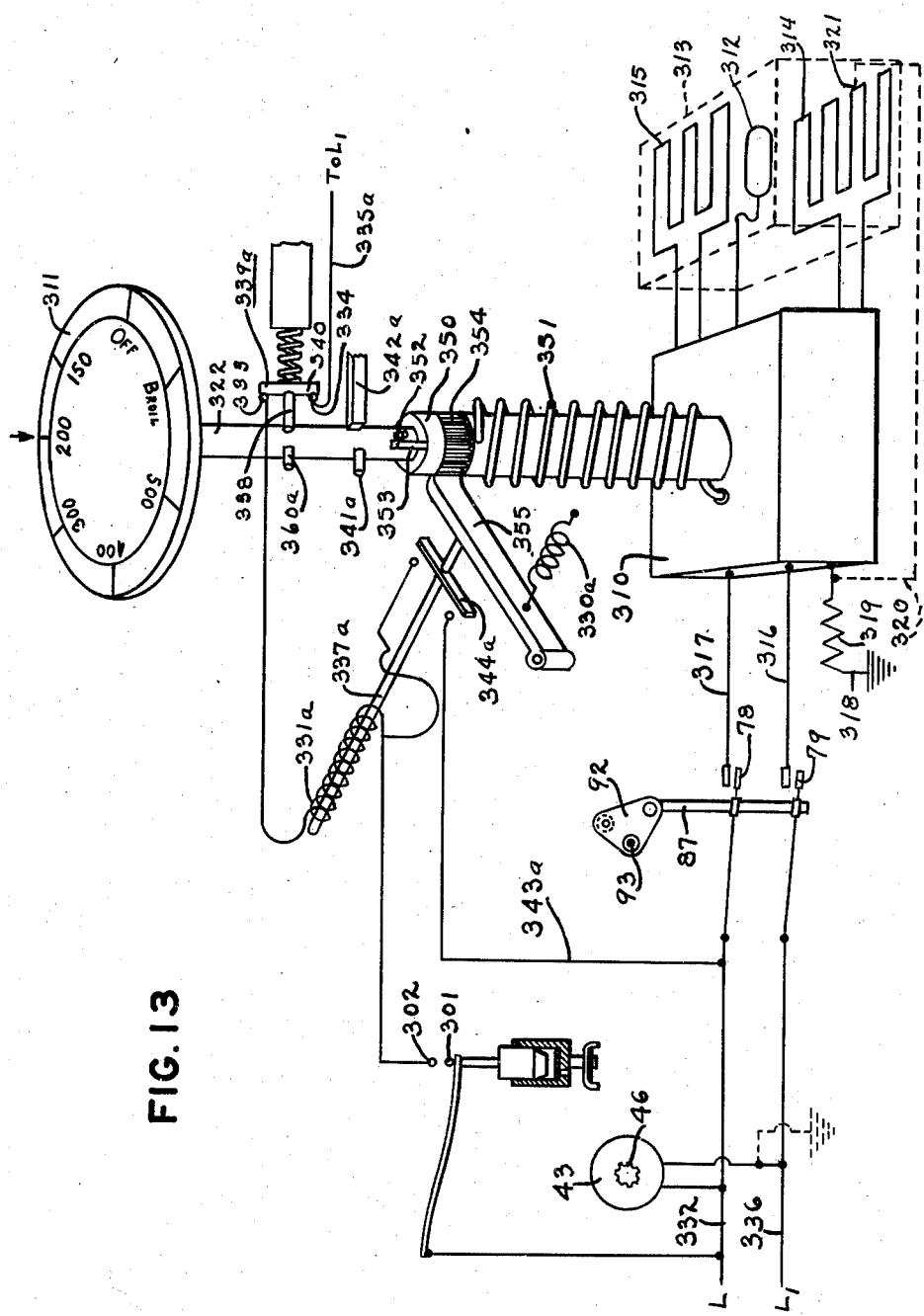
Fig. 13 is a view similar to Fig. 12, but showing a modified form of return means.

In the modification shown in Fig. 13, the returning means for the knob 311 is powered by the user as he turns the knob from the off position to a cooking position. All of the parts shown in Fig. 13 operate as in Fig. 12, except for the return means. For example, the shaft 322 is loosely surrounded by a sleeve 350. A spring 351 has one end secured to the casing or anchor means 310 and the other end secured to the sleeve 350. A pin 352 is carried by the shaft 322 and a coacting lug 353 is carried by the sleeve 350. As the knob 311 is turned clockwise by the user, the pin 352 drives the lug 353 and sleeve 350 clockwise. The sleeve 350 has a ratchet band 354 with which a pawl 355 cooperates and holds the sleeve 350 at the farthermost clockwise position to which it is turned. The user can therefore turn the knob 311 to any position, such as 500 or broil, and can then return the knob 311 to a lower position such as 200; but the sleeve 350 remains at the farthest clockwise position, being held by the pawl 355. The turning movement of sleeve 350 winds the spring 351. When the switch 301, 302 is closed, as heretofore described, the solenoid 331a is energized, pulling the armature 337a and the pawl 355 against the action of the tension spring 330a. This releases the sleeve 350 and allows the spring 351 to rotate the sleeve 350 and shaft 322 until the knob 311 returns to the off position. At this time the pin 341a abuts the stationary stop 342a, and the pin 360a opens the switch 339a to break the holding circuit of the solenoid 331a. The holding circuit 343a, 344a, 335a is substantially the same as that disclosed in Fig. 12 and may be used if desired. However, since the returning movement of spring 351 is rapid, the holding circuit may be omitted, if desired, reliance being made on the return of knob 311 to the off position before switch 301, 302 is re-opened by the dash-pot construction.

The operation of the modification shown in Fig. 13, taken in combination with the disclosure of Figs. 1 to 11, 14 and 15, is as follows: The user (at two o'clock) sets the indicators 35 and 34 at three and six respectively (by way of example) and sets the knob 311 at 200. The setting of the knob at 200 winds the spring 351 as heretofore described. When the time indicator 35 comes into coincidence with the on or start indicator 33 at three o'clock, the switch 78, 79 is closed, as heretofore described causing the heaters 314 and 315 to be cycled by thermostat 310, as heretofore described until six o'clock. When the time indicator 35 comes into coincidence with the stop or off indicator 34 at six o'clock, the switch 301, 302 is temporarily closed, thus energizing the solenoid 331a and moving the pawl 355 away from the ratchet band 354. This allows the sleeve 350 to be rotated counterclockwise by the spring 351 and drives the shaft 322 and knob 311 back to the off position. Since the contacts in the thermostat 310 (Figs. 12 and 13) remain open at all times as long as the knob 311 is at the off position, the heaters will not be energized again until the user moves the knob 311 to a cooking position. In Fig. 13, the knob 311 will not be returned from a cooking position to the off position a second time, until the user adjusts the off indicator 34 away from coincidence with the time indicator 35.

In either modification, the user may adjust the off indicator 34 and the thermostat knob 311 and may thus start a cooking interval of time immediately to be terminated at the time selected by the indicator 34.

In the Hutt patent, and in this application, the off and on indicators are shown concentric with the time indicator; but it is to be understood that they may have their own separate dials. The word "coincidence" as herein used, is intended to mean that the time indicator shows a time which coincides with the setting of the on or off indicator, regardless of whether they are concentric or not.

It is obvious that this invention may be used with gas stoves. For example the switches herein disclosed may be used to operate solenoid gas valves in the well-known manner, or gas valves may be directly substituted for the switches.

While the form of embodiment of the invention as herein disclosed, constitutes a preferred form, it is to be understood that other forms might be adopted, as may come within the scope of the claims which follow.

What is claimed is as follows:

1. In a device of the character described, a source of heat energy, an oven, heating means for said oven, a thermostat controlling the flow of energy from said source to said heating means in response to oven temperature, thermostat adjusting means for said thermostat having an off position and a cooking position, return means for returning said adjusting means from cooking position to off position, a clock having on, off and time indicators, means for adjusting said on and off indicators away from coincidence with said time indicator, means for locking said on and off indicators with said time indicator as said time indicator comes into coincidence with said on and off indicators, switch means controlling conjointly with said thermostat the flow of energy from said source to said heating means, means opening said switch means when said on indicator is adjusted away from coincidence with said time indicator and closing said switch means when said time indicator comes into coincidence with said on indicator, said return means including spring means powered by the user and being rendered effective when said time indicator comes into coincidence with said off indicator, and means preventing said return means from operating more than once until after said off indicator has again been adjusted away from said time indicator.

2. In a device of the character described, a source of heat energy, heating means, a thermostat controlling the flow of energy from said source to said heating means in response to temperature created by said heating means, thermostat adjusting means for said thermostat including a rotatable shaft movable from an off position to a heating position, a sleeve around said shaft, a spring connected to said sleeve and powered by movement of said shaft from said off position to said heating position, a timer having time adjusting means to set a heating time limit for said heating means, means releasing said spring at said time limit, and means causing said spring and sleeve to return said shaft from heating position to said off position.

3. In a device of the character described, a thermostat, said thermostat having an adjusting shaft rotatable from a first position to a second position, a sleeve surrounding said shaft, a spring connected at one point to said sleeve and to anchor means at another point and powered by rotation of said sleeve, one-way drive means between said sleeve and shaft to power said spring while said shaft is moved from said first position to said second position and to allow said shaft to be manually returned independently of said sleeve, one-way locking means for said sleeve to lock said sleeve in spring powered position, and release means for said locking means to cause said sleeve to return said shaft from second position to first position.

4. In a device of the character described, a thermostat, said thermostat having an adjusting shaft rotatable from a first position to a second position, a sleeve surrounding said shaft, a spring connected at one point to said sleeve and to anchor means at another point and powered by rotation of said sleeve, one-way drive means between said sleeve and shaft to power said spring while said shaft is moved from said first position to said second position and to allow said shaft to be manually returned independently of said sleeve, one-way locking means for said sleeve to lock said sleeve in spring powered position, release means for said locking means to cause said sleeve to return said shaft from second position to first position, a timer having time adjusting means to set a time limit for automatic return of said shaft from said second position to said first position, and means controlled by said timer to actuate said release means when said time limit is reached.

5. In a device of the character described, a thermostat, said thermostat having an adjusting shaft rotatable from a first position to a second position, a sleeve surrounding said shaft, one-way clutch means between said sleeve and shaft to rotate said sleeve when said shaft is manually rotated from said first position to said second position, and to allow said shaft to be manually rotated from said second position to said first position independently of said sleeve, one-way locking means for said sleeve, release means for said locking means, and means to return said sleeve and shaft from said second position to said first position when said release means is actuated.

6. In a device of the character described, a source of heat energy, heating means, a thermostat controlling the flow of energy from said source to said heating means in response to temperature created by said heating means, thermostat adjusting means for said thermostat including a rotatable shaft movable from an off position to a heating position, a spring powered by movement of said shaft from said off position to said heating position, a timer having time adjusting means to set a heating time limit for said heating means, means releasing said spring at said time limit, means permitting said shaft to be returned manually from said heating position toward said off position to an intermediate heating position while maintaining said spring in powered condition, and means causing said spring to return said shaft from heating position to said off position.

ROBERT R. CANDOR.

REFERENCES CITED

The following references are of record in the file of this patent:

UNITED STATES PATENTS

| Number | Name | Date |
|---|---|---|
| 162,255 | Seyter | Apr. 20, 1875 |
| 1,758,619 | Phillips | May 13, 1930 |
| 2,088,728 | Stranszky | Aug. 3, 1937 |
| 2,276,930 | Clark | Mar. 17, 1942 |
| 2,288,175 | Almquist et al. | June 30, 1942 |
| 2,392,166 | Lockwood | Jan. 1, 1946 |